(No Model.)

W. P. CLARK.
DRAFT TUBE FOR SODA WATER AND OTHER BEVERAGES.

No. 257,472. Patented May 9, 1882.

Witnesses:
Harry E. Remick
H. H. Letteney

Inventor:
William P. Clark
By Porter & Hutchinson
Attys (No Model.) 2 Sheets—Sheet 2.
W. P. CLARK.
DRAFT TUBE FOR SODA WATER AND OTHER BEVERAGES.
No. 257,472. Patented May 9, 1882.

Witnesses:
Harry E. Remich,
H. H. Letteney.

Inventor,
William P. Clark
By Porter & Hutchinson
Attys.

UNITED STATES PATENT OFFICE.

WILLIAM P. CLARK, OF MEDFORD, MASSACHUSETTS.

DRAFT-TUBE FOR SODA-WATER AND OTHER BEVERAGES.

SPECIFICATION forming part of Letters Patent No. 257,472, dated May 9, 1882.

Application filed November 4, 1881. (No model.)

*To all whom it may concern:*

Be it known that I, WM. P. CLARK, of Medford, State of Massachusetts, have invented an Improvement in Draft-Tubes for Soda-Water and other Beverages, of which the following is a specification.

This invention relates to certain improvements in the draft-tube for which Letters Patent of the United States No. 229,304 were issued to me June 29, 1880, and the invention will, in connection with the annexed drawings, be hereinafter fully described, and specifically defined in the appended claims.

Figure 1:
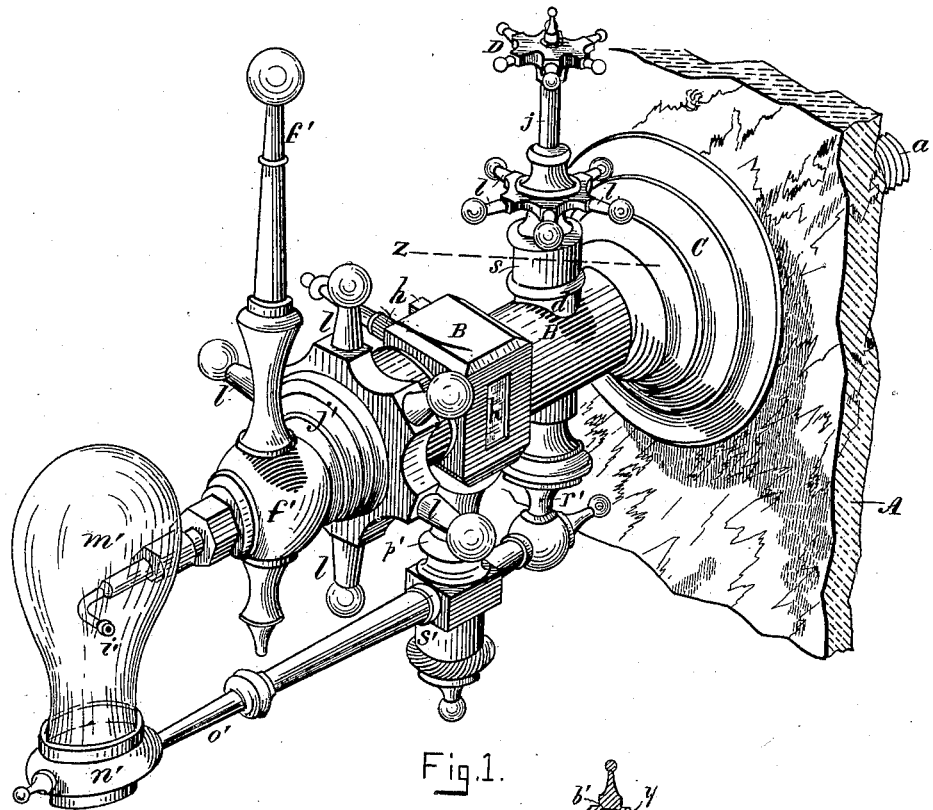
Figure 2:
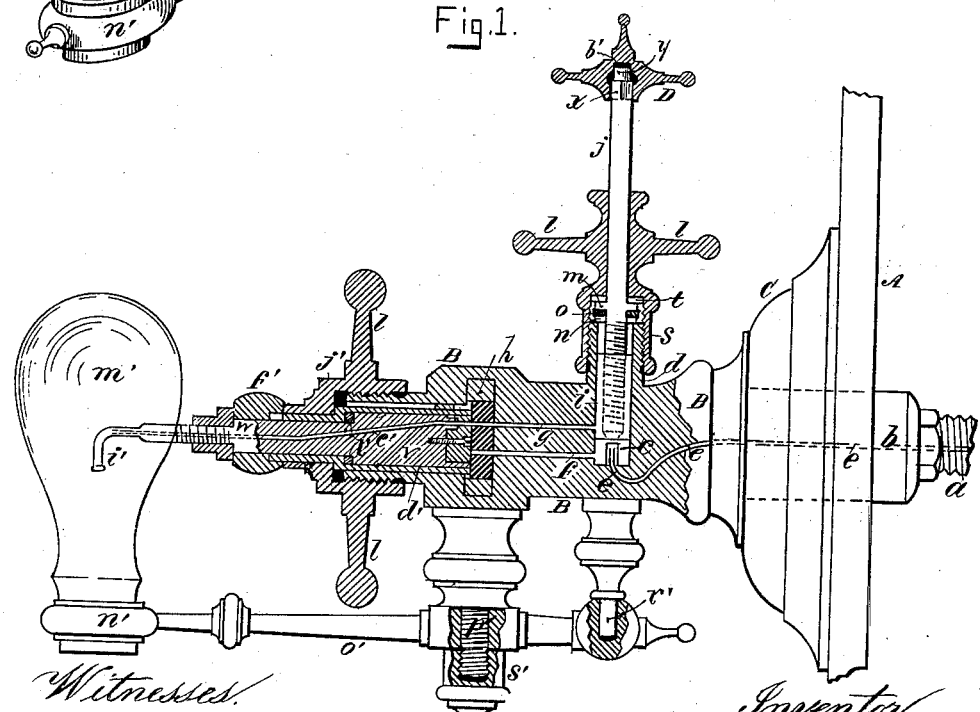
Figure 3:
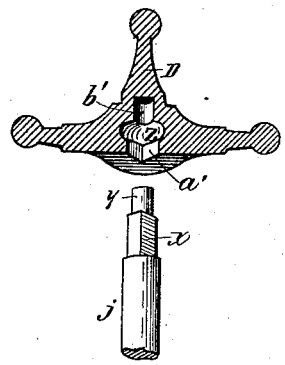
Figure 4:
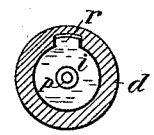
Figure 5:
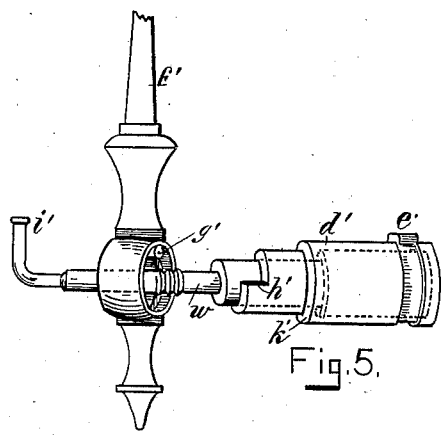
Figure 6:
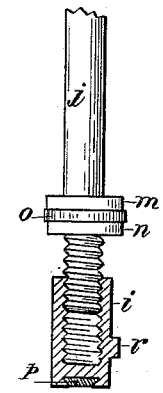
Figure 7:
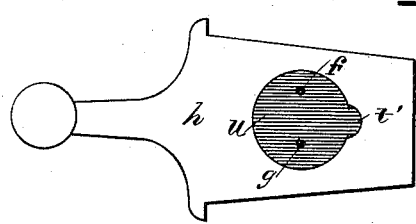

Figure 1 is a perspective view of a draft-tube embodying my present invention. Fig. 2 is a longitudinal vertical section thereof. Fig. 3 is a detached view, showing in perspective the upper portion of the vertical regulating and shut-off valve-stem and in vertical section the hand-wheel by which such stem is actuated, thereby showing the method of connecting such stem and wheel. Fig. 4 is a transverse section as on line $z$, Fig. 1, and showing the lower face of the valve in plan, the wall in section, and method of interlocking the valve and wall. Fig. 5 is a detached perspective view, showing the draft-valve, its delivery-nozzle, the valve-sleeve, and the valve-lever. Fig. 6 is a vertical sectional elevation, showing the regulating-valve in longitudinal vertical section, and the stem thereof in elevation. Fig. 7 is a plan view of the packing-holder with the packing therein interlocked by my improved method.

In said views, A represents the marble slab or other vertical support to which the draft-tube is to be attached.

B is the body of the draft-tube, which is secured to slab A by shank $a$, which passes through the ornamental collar C and said slab, and is secured in position by the screw-nut $b$ in the usual manner. Said shank $a$ is formed with an axial passage, $e$, in the usual manner, which communicates with the passage in the supply-pipe, that may be coupled to said shank. The passage $e$ in shank $a$ extends forward in body B and terminates as the axial passage in the vertical nipple $c$, which is arranged at the bottom of a transverse vertical passage in body B, which passage is in part formed by the circular wall $d$, which extends above the periphery of body B, as shown in Figs. 1, 2. In body B are formed the lower passage, $f$, and upper passage, $g$, which extend from the chamber in which nipple $c$ is seated to the aperture which receives the packing-holder $h$, as shown in Fig. 2.

For the purpose of regulating or shutting off the flow of liquid through nipple $c$, and also regulating the flow of the liquid through passage $g$ when the same is in use, I employ a valve constructed as follows:

The valve $i$ and its stem $j$ are united by a left-hand thread, as shown in Fig. 6, and upon head of the valve is formed a stud, $r$, which interlocks in a groove in the wall $d$, which incloses the valve. (See Fig. 4) Upon stem $j$ is formed a rigid collar, $m$, below which and next valve $i$ is placed the loose metallic collar $n$, while an elastic collar, $o$, is seated between said metallic collars, as shown in said Fig. 6. In cap $s$, which is threaded upon walls $d$, is seated an elastic washer, $t$, which, when the several parts are in position, is compressed upon the upper edge or rim of wall $d$, and upon the rigid collar $m$ of stem $j$, while collar $n$ is seated upon a shoulder formed in wall $d$ by enlarging the upper portion of the valve-chamber therein, (see Fig. 2,) whereby the turning down of cap $s$ packs washer $t$ upon collar $m$ and wall $d$, and shuts off the escape of liquid between the collar and wall, while the elastic collar $o$ is expanded against the interior of wall $d$, thereby tending to pack the space between the rigid collars on stem $j$ and said wall, and also causing loose collar $n$ to be firmly seated upon the shoulder in said wall, and yet to move thereon when the stem is rotated without grinding and wearing such collar and shoulder. By turning stem $j$ in a left-hand direction its valve $i$ is raised to allow the flow of the liquid through nipple $c$, and by adjusting the lower end or face of said valve relatively to passage $g$ the same may be opened to any desired extent, and as said passage is arranged to deliver the so-called "sharp stream" it may thus be adjusted with reference to the degree of pressure in the supply-fountain, and when the valve is thus raised the passage $f$ is open to deliver the flat stream whenever brought into requisition. The valve $i$ is not usually further moved than merely to govern or adjust the force of the sharp stream, as just specified, as the outer valve is used to shut off the flow of liquid, as will be described; but should it be necessary at any time to adjust such outer valve, then by actuating stem $j$ valve $i$ is, by the means described, moved down, so as to seat its central packing, $p$, upon nipple $c$, thereby shutting off the further flow of the liquid.

For the purpose of actuating stem $j$ and its valve $i$ a hand-wheel cap, D, is removably secured thereon in the manner shown in Fig. 3, which consists in forming said stem with a diminished round upper section, $y$, and next thereto a rectangular section, $x$, while in cap D is formed a corresponding interior cylindrical cavity, $b'$, and just within the body of the cap a corresponding square passage, $a'$, while between said round and square passages is formed an enlarged chamber, $z$, by which construction of parts great facility of construction and efficiency and convenience in use are effected, as a cylindrical passage is first formed in cap D of the size of section $b'$, when the chamber $z$ is readily formed, after which the square section $a'$ is formed by "broaching" through to said chamber, and while cap D is secured from rotation by said square sections, and is secured from vibration by the close bearings of both said round and square sections, yet it may be instantly removed from or replaced on the stem when desired.

The passages $f g$ extend in body B to the transverse passage for the packing-holder $h$, and packing $u$ in holder $h$ is provided with passages coinciding with said passages $f g$, as shown in Figs. 2, 7.

A sleeve, $d'$, is seated in the front portion of body B, as shown in Fig. 2, and is interlocked therewith by its stud $e'$, which seats in a groove in body B. The valve $v$ and a portion of the length of its stem $w$ are seated in said sleeve $d'$ and partially rotate therein, such rotation being effected by lever $f'$, which is secured on said stem, and which is provided with a check-pin, $g'$, which, by its contact with stops $h' h'$ in sleeve $d'$, adjusts the position of of curved nozzle $i'$ of stem $w$ either up or down, as desired, as is fully described in my said former patent. A removable face is secured to valve $v$ by an axial screw, as shown in Fig. 2, and a passage, $c'$, is formed therein at the same distance from its axis as are passages $f g$, so that when said valve is so rotated as to turn nozzle $i'$ downward said passage in the valve is coincident with the sharp-stream passage $g$, and when said nozzle is turned upward said valve-passage is coincident with the flat-stream passage $f$. Said passage $c'$ is deflected to the axis of valve $v$ and extends through the same and through nozzle $i'$, as in my said former patent. The sleeve $d'$ and valve $v$ are held in the requisite close contact with packing $u$ by means of cap $j'$, which is threaded on body B, and acts against shoulder $k'$ of sleeve $d'$, the interior counterpart of which shoulder bears against packing $l'$, which is placed on stem $w$ of valve $v$, as shown in Fig. 2. Upon said cap $j'$, as also upon cap $s$, are formed the radial ornamental arms $l$, which furnish the ever-ready means of actuating said caps without the use of wrench or spanner, and which obviate the necessity of disfiguring said caps by a spanner-hole, or of forming them with angles by which to engage an actuating-wrench.

The spraying-glass $m'$, within which nozzle $i'$ is located, is secured in band $n'$ of rod $o'$, said rod being secured upon studs $p' r'$, which extend from body B, said stud $p'$ passing through the rod and being provided with a screw-nut, $s'$, which secures the rod in position, the stud $r'$ serving to secure the rod from lateral vibration on stud $p'$. This method of securing said rod is preferable to that shown in my former patent in that one nut serves to secure the rod in place, and the two studs not only secure it from lateral displacement, but the stud $r'$ serves as a fulcrum to prevent depression of the outer end of the rod, which supports the glass $m'$.

The packing-holder $h$ is formed with the usual circular passage for the insertion of packing $u$; but said holder is also formed with a projection or seat extending from said passage to receive the corresponding projection, $t'$, of packing $u$, whereby said packing is prevented from rotating in the holder when valve $v$ is rotated.

I claim as my invention—

1. The combination of valve-stem $j$, its head $i$, threaded thereon and arranged to interlock in wall $d$, the rigid collar $m$ on said stem, the loose metallic collar $n$, and elastic packing $o$, arranged between said collars, substantially as specified.

2. The combination of valve-stem $j$, its interthreaded head $i$, collars $m$ $n$, packing $o$, and cap $s$, with its packing $t$, arranged to seat upon both said collar $m$ and the rim of the inclosing-wall $d$, substantially as specified.

3. The combination of valve $i$, the inlet-conduit $e$, arranged to be closed and opened by said valve, and the outlet-passages $f g$, connecting with the valve-chamber and provided with mechanism whereby either of said passages may be rendered operative and the other inoperative, or both be rendered inoperative, substantially as specified.

4. The combination of valve $i$, conduit $e$, conduits $f g$, and rotary valve $v$, having a longitudinal passage arranged to be brought into coincidence with either of said conduits $f g$, substantially as specified.

5. The rigid packing-holder $h$, formed with a recess or seat extending outside the circumferential line of the packing-passage therein, and the packing $u$, formed with a corresponding projection, $t'$, to interlock in such seat in the holder, substantially as specified.

6. The combination of glass $m'$, its supporting-rod $o'$, with its ring $n'$, and studs $p'$ $r'$, depending from body B and connected with and sustaining said rod, substantially as specified.

7. In combination with rotary valve $v$ and coacting conduits $f$ $g$, the valve $i$, arranged to close the supply-passage $e$ and to regulate the force of the jet through passage $g$ as desired, substantially as specified.

WILLIAM P. CLARK.

Witnesses:
T. W. PORTER,
H. H. LETTENEY.